US011719999B1

(12) United States Patent
Chen (10) Patent No.: US 11,719,999 B1
(45) Date of Patent: Aug. 8, 2023

(54) FOLDABLE SOFT BOX UMBRELLA TRAY AND SOFT BOX

(71) Applicant: YUEQING ORIGINALITY PHOTOGRAPHY EQUIPMENT CO., LTD., Yueqing (CN)

(72) Inventor: Qingyuan Chen, Yueqing (CN)

(73) Assignee: YUEQING ORIGINALITY PHOTOGRAPHY EQUIPMENT CO., LTD., Yueqing (CN)

( * ) Notice: Subject to any disclaimer, the term of this patent is extended or adjusted under 35 U.S.C. 154(b) by 0 days.

(21) Appl. No.: 18/093,544

(22) Filed: Jan. 5, 2023

(30) Foreign Application Priority Data

Dec. 8, 2022 (CN) .......................... 202223310877.X (51) Int. Cl.
G03B 15/06 (2021.01)
G03B 15/04 (2021.01)

(52) U.S. Cl.
CPC .......... *G03B 15/06* (2013.01); *G03B 15/0484* (2013.01)

(58) Field of Classification Search
CPC .... G03B 15/06; G03B 15/0484; G03B 15/02; F21V 7/18; F21V 21/14; F21V 21/30; G02B 15/02
See application file for complete search history.

(56) References Cited

U.S. PATENT DOCUMENTS

| | | | | |
|---|---|---|---|---|
| 10,268,105 B1* | 4/2019 | Zhu | ....................... | F21V 7/0008 |
| 10,520,796 B2* | 12/2019 | Chen | ....................... | F21V 7/005 |
| 2002/0141172 A1* | 10/2002 | Shirilla | ................... | G03B 15/06 |
| | | | | 362/450 |
| 2021/0247665 A1* | 8/2021 | Kim | ....................... | G03B 15/06 |

* cited by examiner

*Primary Examiner* — Bao Q Truong
(74) *Attorney, Agent, or Firm* — Daniel M. Cohn; Howard M. Cohn (57) ABSTRACT

The utility model discloses a foldable soft box umbrella tray, which comprises a first tray body provided with a first abutting end surface, a second tray body provided with a second abutting end surface, first cross arms and second cross arms which are movably connected with the first tray body and the second tray body respectively, and a connecting shaft which passes through the first cross arms and the second cross arms and is rotationally connected therewith. When the first tray body and the second tray body are unfolded, the first abutting end surface and the second abutting end surface are attached; and the first cross arms and the second cross arms are hidden. A soft box of the utility model can be folded into a flat shape, so that storage space is reduced, which is convenient for transportation and carrying.

14 Claims, 10 Drawing Sheets

FOLDABLE SOFT BOX UMBRELLA TRAY AND SOFT BOX

TECHNICAL FIELD

The utility model belongs to the technical field of soft boxes, and in particular relates to a foldable soft box umbrella tray and a soft box.

BACKGROUND ART

In order to improve a shooting effect, a soft box is usually set on a cover of a flash lamp to provide a soft auxiliary light source. Most of existing soft boxes have an umbrella-shaped structure with open ends. When such soft box is stored, a plurality of supporting members are folded around the circumference of the annular open end. Because the outer diameter of the annular open end is relatively large, even in a folded state, the supporting members still form a gap around the circumference near the open end; and a storage volume is still relatively large, which is inconvenient for carrying and transportation.

In order to solve the above problems, a foldable soft box appears in the market, which can fold an upper semicircular structure of a soft box umbrella tray. However, a folding structure is relatively complex; a volume of the folding structure is relatively large; and the part of the folding structure will protrude from the surface of the umbrella tray, which greatly increases a probability of light leakage or shadow generation.

SUMMARY OF THE INVENTION

In order to overcome shortcomings of the prior art, the utility model provides a foldable soft box umbrella tray and a soft box, wherein a volume of a folding structure of the umbrella tray is small; light leakage or shadow generation will not take place; and a soft light effect is good. The utility model adopts the following technical solution to solve the technical problems: a foldable soft box umbrella tray, which comprises:

a first tray body, wherein an open end is provided with a first abutting end surface;
a second tray body which can be spliced with the first tray body to form a ring shape, wherein an open end is provided with a second abutting end surface;
first cross arms which are movably connected with the first tray body and the second tray body respectively;
second cross arms which are movably connected with the second tray body and the first tray body respectively; and
a connecting shaft which passes through the first cross arms and the second cross arms and is rotationally connected therewith.

When the first tray body and the second tray body are unfolded to a same horizontal plane, the first abutting end surface and the second abutting end surface are attached; and the first cross arms and the second cross arms are hidden in the first tray body and the second tray body.

The umbrella tray in the utility model is formed by splicing the first tray body and the second tray body. During storage, the first tray body and the second tray body can be folded up and down; and at this time, the soft box can be folded into a flat shape. Compared with a three-dimensional state of the umbrella tray and a supporting rod during folding, space occupied by storage is greatly reduced, which is convenient for transportation and carrying. During unfolding, the first cross arms and the second cross arms are hidden in the first tray body and the second tray body; and there is no structure protruding from surfaces of the first tray body and the second tray body, so that a danger of light leakage is avoided; shadows are not generated; and a soft light effect is better. The first cross arms, the second cross arms and the connecting shaft are small in volume, stable in matching structures and replaceable, thereby prolonging an overall service life of the umbrella tray. The first cross arms, the second cross arms and the connecting shaft are hidden in the first tray body and the second tray body in the unfolded state, thereby achieving an effect of falling resistance and wear resistance.

Further, the first cross arms are movably connected with the first tray body through a first guide shaft, and are rotationally connected with the second tray body through a first adapter shaft; and the second cross arms are movably connected with the second tray body through a second guide shaft, and are rotationally connected with the first tray body through a second adapter shaft. Further, a first stroke groove for the first guide shaft to roll is formed in the first tray body; and a second stroke groove for the second guide shaft to roll is formed in the second tray body. The first guide shaft rolls in the first stroke groove; and the second guide shaft rolls in the second stroke groove, thereby realizing movable connection between the first cross arms and the first tray body, and movable connection between the second cross arms and the second tray body. In addition, the stroke groove limits a rolling range of the guide shaft; and structures in unfolded and folded states are relatively stable.

Further, each first cross arm comprises a first body, and a first protrusion and a first extension section located at both ends of the first body, wherein the connecting shaft is arranged at the first body; the first guide shaft is arranged at the first protrusion; and the first adapter shaft is arranged at the first extension section;

Each second cross arm comprises a second body, and a second protrusion and a second extension section located at both ends of the second body, wherein the connecting shaft is arranged at the second body; the second guide shaft is arranged at the second protrusion; and the second adapter shaft is arranged at the second extension section. Structure design of the first cross arms and the second cross arms is reasonable. On the premise of ensuring smooth rotation, the first tray body and the second tray body are hidden inside while being unfolded; the volume of exposed parts is small when the first tray body and the second tray body are folded; contact friction between the first cross arms and the second cross arms and the first tray body and the second tray body is slight; and a service life of the umbrella tray is long.

Further, a first groove for accommodating the first protrusion and a first groove body for accommodating the second extension section are formed in the first tray body; the first groove is communicated with the first groove body and is opened at the first abutting end surface; a second groove for accommodating the second protrusion and a second groove body for accommodating the first extension section are formed in the second tray body; and the second groove is communicated with the second groove body, is opened at the second abutting end surface and directly faces the first groove body.

Further, a first sunken groove for accommodating the second adapter shaft is formed at a joint of the first protrusion and the first body. The first sunken groove can prevent the second adapter shaft from interfering with the first cross arms, and ensure that the first guide shaft can roll smoothly in the first stroke groove.

Further, the connecting shaft is arranged along a radial direction of the first tray body or the second tray body; the first cross arm has a first plane; and the second cross arm has a second plane. When the first tray body and the second tray body are unfolded, the first plane can be abutted against the first tray body; and the second plane can be abutted against the second tray body. The first plane plays a good role in supporting the first tray body; and the second plane plays a good role in supporting the second tray body, so that the overall structure is more stable.

Further, the number of the first cross arms and/or the second cross arms is two or more; the first cross arms and the second cross arms are alternately arranged; and side surfaces of the first cross arms and the second cross arms are attached. The plurality of first cross arms and the plurality of second cross arms are overlapped for use, so that overall strength is higher; and rotation stability is higher.

Further, the foldable soft box umbrella tray further comprises a connecting seat for connecting a light source, and an elastic buckle unit; the elastic buckle unit at least comprises a buckle body and a limiting part which extends from the buckle body and is abutted against the connecting seat; the buckle body is assembled on the first tray body or the second tray body; and when external force is applied to the buckle body, the limiting part can be driven to be separated from the connecting seat. The elastic buckle unit can stably limit the connecting seat from being separated from the first tray body or the second tray body, thereby ensuring effective assembly and connection between the light source and the soft box umbrella tray.

Further, the elastic buckle unit further comprises an elastic piece, one end of which is abutted against the buckle body and is used for driving the limiting part to automatically reset so as to be abutted against the connecting seat. The structure design of the elastic buckle unit is reasonable; and the connecting seat is simple and convenient to disassemble and assemble.

Further, the elastic buckle unit further comprises a force applying part which extends out of the first tray body or the second tray body from the buckle body; the force applying part, the buckle body and the elastic piece are sequentially arranged along a vertical direction; and the limiting part extends inward in the radial direction. By force application in the vertical direction, the buckle body is driven to move and compress the elastic piece, so that the limiting part which limits the connecting seat in the radial direction is separated from the connecting seat; the structure design is reasonable; and operations are convenient and labor-saving.

Further, the foldable soft box umbrella tray further comprises fasteners which are abutted against the connecting seat in an axial direction. The limiting part of the elastic buckle unit is abutted against the connecting seat in the radial direction; and the fasteners are abutted against the connecting seat in the axial direction, so that limiting of the connecting seat is more stable through matching in the two directions.

The utility model further discloses a soft box, which comprises the umbrella tray, a plurality of supporting rods arranged at intervals along the circumference of the umbrella tray, and soft light cloth.

Further, the first tray body and the second tray body are circumferentially provided with ball grooves for clamping ends of the supporting rods, and movable grooves communicated with the ball grooves, wherein the movable grooves are flared; and a groove wall of a flared part of each movable groove increases in a gradient manner from a position radially corresponding to each ball groove. A height of the groove wall of the flared part of the movable groove changes, so that the supporting rod can be smoothly unfolded or folded; the supporting rod can be maintained in the unfolded state when being unfolded, and is not easily switched from the unfolded state to the folded state; and operations are labor-saving when the supporting rod is switched from the folded state to the unfolded state.

The utility model has the beneficial effects that a first clamping tray and a second clamping tray can be folded into an up-down overlaid state; and the soft box can be folded into the flat shape, which reduces the space occupied by storage and is convenient for transportation and carrying. During unfolding, the first cross arms and the second cross arms are hidden in the first tray body and the second tray body; and there is no structure protruding from the surfaces of the first tray body and the second tray body, so that the danger of light leakage is avoided; the shadows are not generated; and the soft light effect is better. The first cross arms, the second cross arms and the connecting shaft are small in volume, stable in the matching structure and replaceable, thereby prolonging the overall service life of the umbrella tray. The supporting rods are not easily switched from the unfolded state to the folded state; and the operations are labor-saving when the supporting rods are switched from the folded state to the unfolded state.

In the figures: 1-first tray body, 11-first abutting end surface, 12-first stroke groove, 13-first groove, 14-first groove body, 15-mounting groove, 2-second tray body, 21-second abutting end surface, 22-second stroke groove, 23-second groove, 24-second groove body, 241-first mounting hold, 25-pressing holding part, 26-expansion groove, 3-first cross arm, 31-first guide shaft, 32-first adapter shaft, 33-first body, 34-first protrusion, 35-first extension section, 36-first sunken groove, 37-first plane, 4-second cross arm, 41-second guide shaft, 42-second adapter shaft, 43-second body, 44-second protrusion, 45-second extension section, 47-second plane, 5-connecting shaft, 61-ball groove, 62-movable groove, 7-supporting rod, 8-fastener, 91-connecting seat, 92-selastic buckle unit, 921-buckle body, 922-limiting part, 923-elastic piece, 924-force applying part, 925-standstill locking flange, and 926-cutting part.

DETAILED DESCRIPTION OF THE INVENTION

In order to make those skilled in the art better understand the solution of the utility model, the technical solution in embodiments of the utility model will be described clearly and completely with reference to drawings in the embodiments of the utility model. Obviously, the described embodiments are only a part of embodiments of the utility model, but not all the embodiments. Based on the embodiments in the utility model, all other embodiments obtained by those ordinarily skilled in the art without creative labor should belong to the scope of protection of the utility model.

As shown in FIGS. 1-12, a foldable soft box umbrella tray comprises a first tray body 1 with an arc shape, a second tray body 2 which can be spliced with the first tray body 1 to form a ring shape, first cross arms 3 movably connected with the first tray body 1 and the second tray body 2 respectively, second cross arms 4 movably connected with the second tray body 2 and the first tray body 1 respectively, and a connecting shaft 5. In the present embodiment, the first tray body 1 is semicircular; an open end thereof has a first abutting end surface 11; the second tray body 2 is also semicircular; and an open end thereof has a second abutting end surface 21. The connecting shaft 5 passes through the first cross arms 3 and the second cross arms 4, and is rotationally connected therewith. When the first tray body 1 and the second tray body 2 are unfolded to a same horizontal plane, the first abutting end surface 11 and the second abutting end surface 21 are attached; and at the same time, the first cross arms 3 and the second cross arms 4 are hidden in the first tray body 1 and the second tray body 2. In other words, when the first tray body 1 and the second tray body 2 are unfolded to form a complete circle, the first cross arms 3 and the second cross arms 4 cannot be seen outside. Of course, in other embodiments, the first tray body 1 and the second tray body 2 may be spliced to form a square ring shape, which is not limited specifically.

Figure 6:
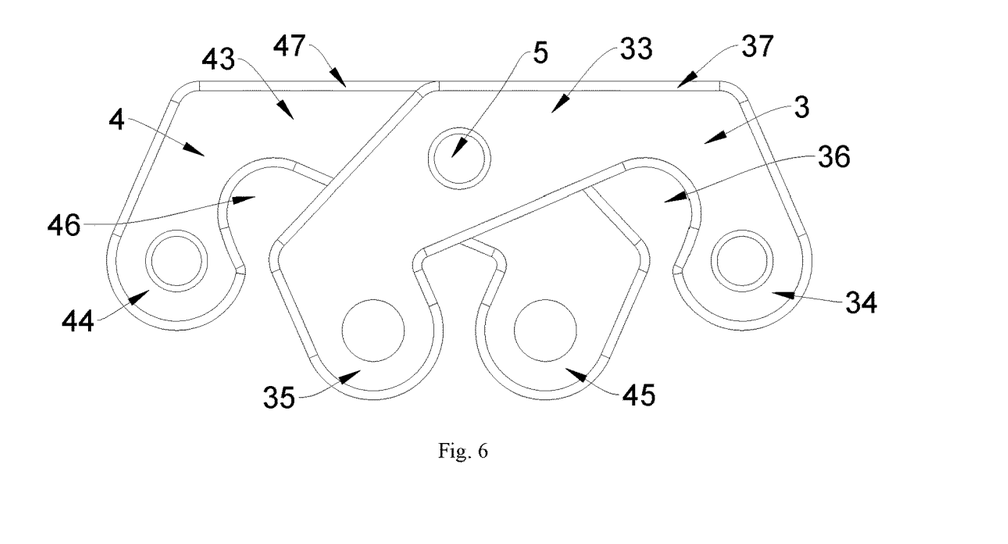
FIG. 6 is a front view of connection between first cross arms and second cross arms by a connecting shaft in the utility model, wherein, at this time, a first tray body and a second tray body are in an unfolded state.
Figure 7:
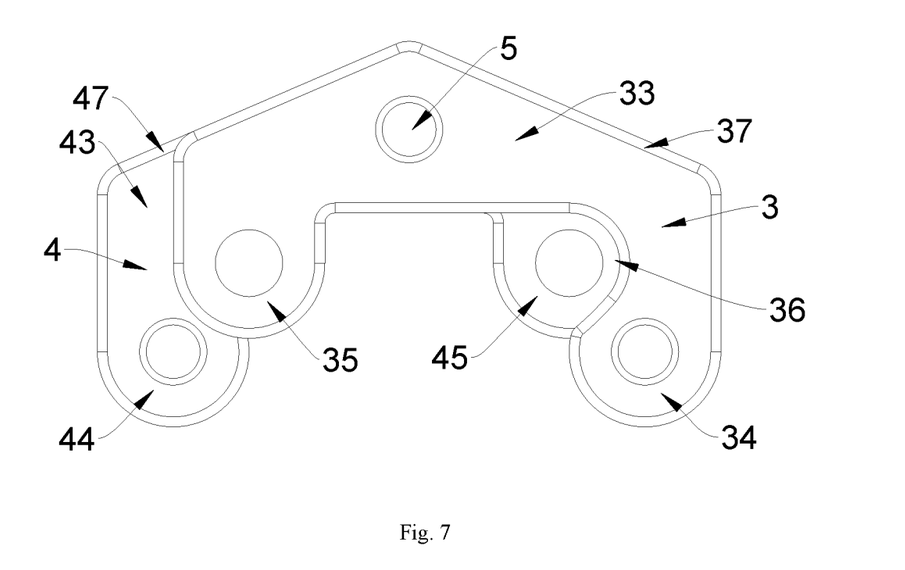
FIG. 7 is a front view of connection between first cross arms and second cross arms by a connecting shaft in the utility model, wherein, at this time, a first tray body and a second tray body are in a folded state.

As shown in FIGS. 6 and 7, each first cross arm 3 comprises a first body 33, and a first protrusion 34 and a first extension section 35 located at both ends of the first body 33, wherein the first protrusion 34 and the first extension section 35 are located on a same side of the first body 33; the above-mentioned connecting shaft 5 is arranged at the first body 33; the first protrusion 34 is provided with a first guide shaft 31; and the first extension section 35 is provided with a first adapter shaft 32. Specifically, the connecting shaft 5 can penetrate and be arranged at the first body 33; both can move relatively; the first guide shaft 31 can penetrate and be arranged at the first protrusion 34; both can move relatively; the first adapter shaft 32 can penetrate and be arranged at the first extension section 35; and both can move relatively.

Each second cross arm 4 comprises a second body 43, and a second protrusion 44 and a second extension section 45 located at both ends of the second body 43, wherein the second protrusion 44 and the second extension section 45 are located on a same side of the second body 43; the above-mentioned connecting shaft 5 is arranged at the second body 43; the second protrusion 44 is provided with a second guide shaft 41; and the second extension section 45 is provided with a second adapter shaft 42. Specifically, the connecting shaft 5 can penetrate and be arranged at the second body 43; both can move relatively; the second guide shaft 41 can penetrate and be arranged at the second protrusion 44; both can move relatively; the second adapter shaft 42 can penetrate and be arranged at the second extension section 45; and both can move relatively.

The structure of the second cross arm 4 is the same as that of the first cross arm 3, but layout directions thereof are opposite, that is, the first protrusion 34 and the second protrusion 44 are located on both sides of the connecting shaft 5.

Figure 8:
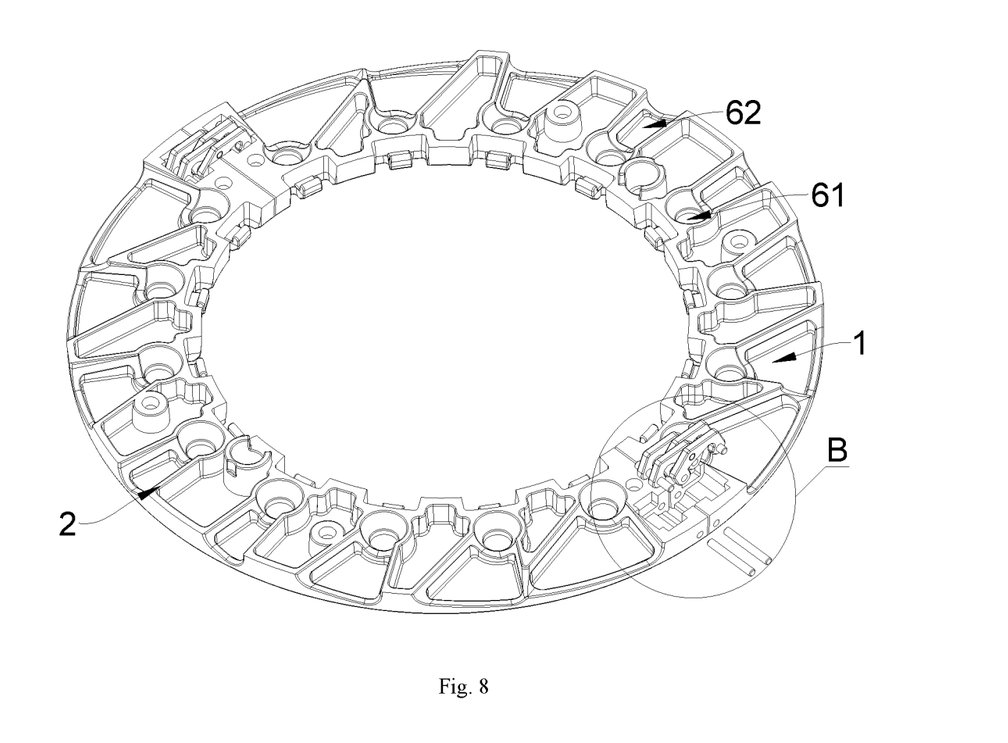
FIG. 8 is a schematic diagram of a matching structure of lower halves of a first tray body and a second tray body with first cross arms, second cross arms and a connecting shaft in the utility model.
Figure 9:
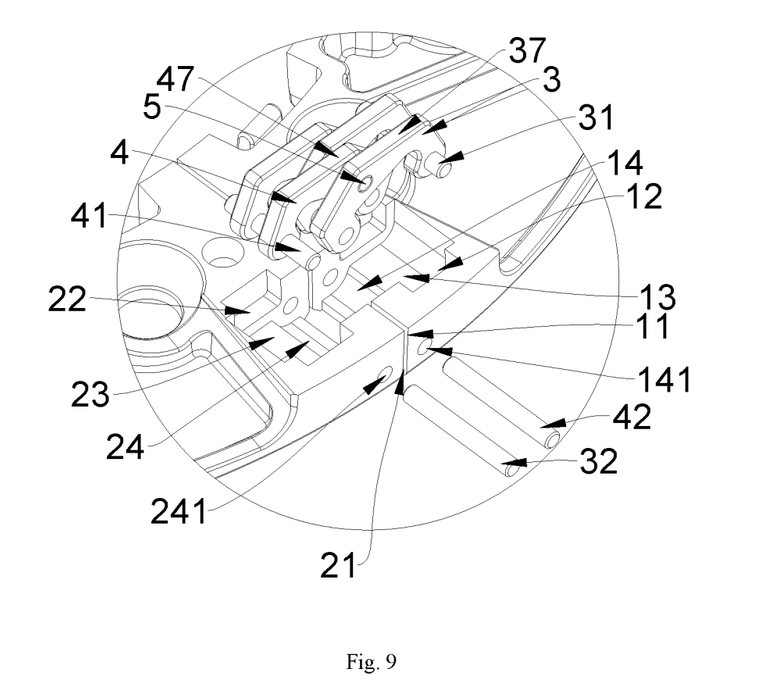
FIG. 9 is an enlarged view of a structure at B in FIG. 8.

The first cross arms 3 are movably connected with the first tray body 1 through the first guide shaft 31, and are rotationally connected with the second tray body 2 through the first adapter shaft 32. Specifically, as shown in FIGS. 8 and 9, a first stroke groove 12 is formed in the first tray body 1; and the first guide shaft 31 rolls in the first stroke groove 12. A first groove 13 and a first groove body 14 are formed in the first tray body 1; the first groove 13 is used for accommodating the first protrusion 34; the first groove body 14 is used for accommodating the second extension section 45; two side walls of the first groove body 14 are provided with second mounting holes 141 into which the second adapter shaft 42 extends; the first groove 13 is communicated with the first groove body 14; a depth of the first groove body 14 is greater than that of the first groove 13; and the first groove body 14 is opened on the first abutting end surface 11. In other words, the first abutting end surface 11 is partially hollow.

The second cross arms 4 are movably connected with the second tray body 2 through the second guide shaft 41, and are rotationally connected with the first tray body 1 through the second adapter shaft 42. Specifically, as shown in FIGS. 2, 3, 8 and 9, a second stroke groove 22 is formed in the second tray body 2; and the second guide shaft 41 rolls in the second stroke groove 22. A second groove 23 and a second groove body 24 are formed in the second tray body 2; the second groove 23 is used for accommodating the second protrusion 44; the second groove body 24 is used for accommodating the first extension section 35; two side walls of the second groove body 24 are provided with first mounting holes 241 into which the first adapter shaft 32 extends; the second groove 23 is communicated with the second groove body 24; a depth of the second groove body 24 is greater than that of the second groove 23; and the second groove body 24 is opened on the second abutting end surface 21. In other words, the second abutting end surface 21 is partially hollow; and the second groove body 24 directly faces the first groove body 14.

In order to avoid interference between the second adapter shaft 42 and the first cross arms 3, a first sunken groove 36 is formed at a joint of the first protrusion 34 and the first body 33, which can be used for accommodating the second adapter shaft 42 and ensure that the first guide shaft 31 can roll smoothly in the first stroke groove 12.

Similarly, in order to avoid interference between the first adapter shaft 32 and the second cross arms 4, a second sunken groove 46 is formed at a joint of the second protrusion 44 and the second body 43, which can be used for accommodating the first adapter shaft 32 and ensure that the second guide shaft 41 can roll smoothly in the second stroke groove 22.

In the present embodiment, the first cross arms 3 and the second cross arms 4 are shaped like flat sheets, with a number of two for both; the first cross arms 3 and the second cross arms 4 are alternately arranged; and the sides of the first cross arms 3 and the second cross arms 4 are attached. Of course, in other embodiments, the numbers of the first cross arms 3 and the second cross arms 4 can be arbitrarily selected, which is not limited specifically.

Figure 10:
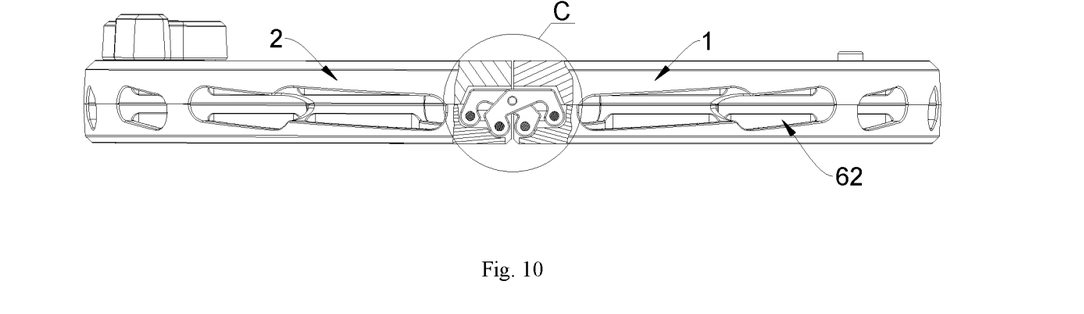
FIG. 10 is a partial sectional view of a first tray body and a second tray body in an unfolded state in the utility model.

After assembly is completed, the connecting shaft 5 is arranged along a radial direction of the first tray body 1 or the second tray body 2. As shown in FIGS. 6 and 10, the first cross arm 3 has a first plane 37; and the second cross arm 4 has a second plane 47. When the first tray body 1 and the second tray body 2 are unfolded to be on the same horizontal plane, the first plane 37 can be abutted against the inner wall of the first tray body 1; and the second plane 47 can be abutted against the inner wall of the second tray body 2, thereby playing a good role of supporting.

Figure 12:
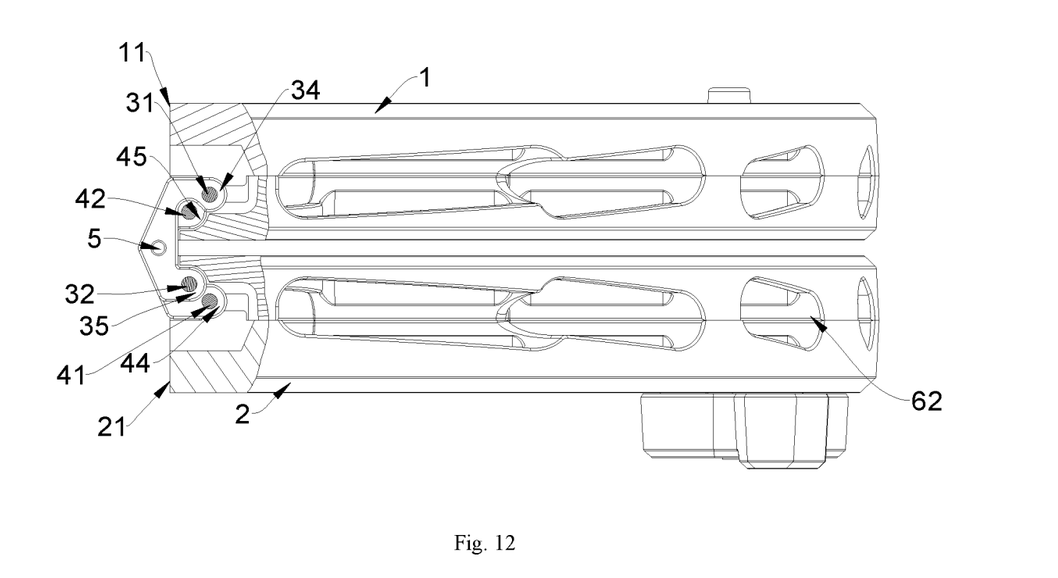
FIG. 12 is a partial sectional view of a first tray body and a second tray body in a folded state in the utility model.
Figure 13:
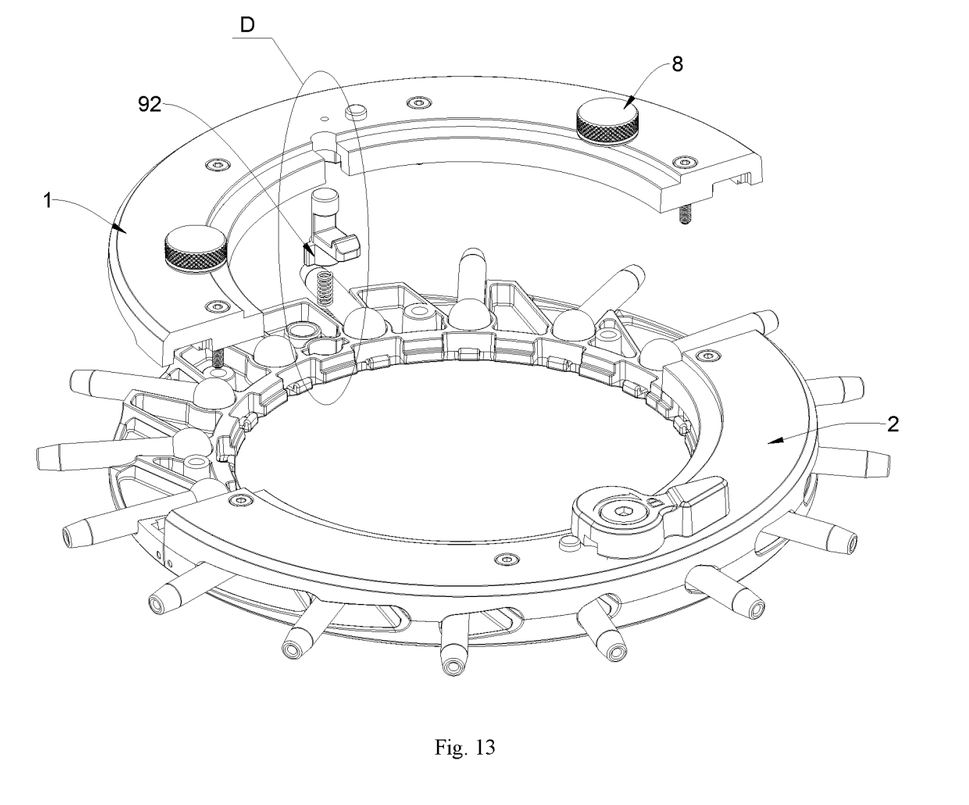
FIG. 13 is an exploded structural diagram of a part where an elastic buckle unit is located in the utility model.
Figure 14:
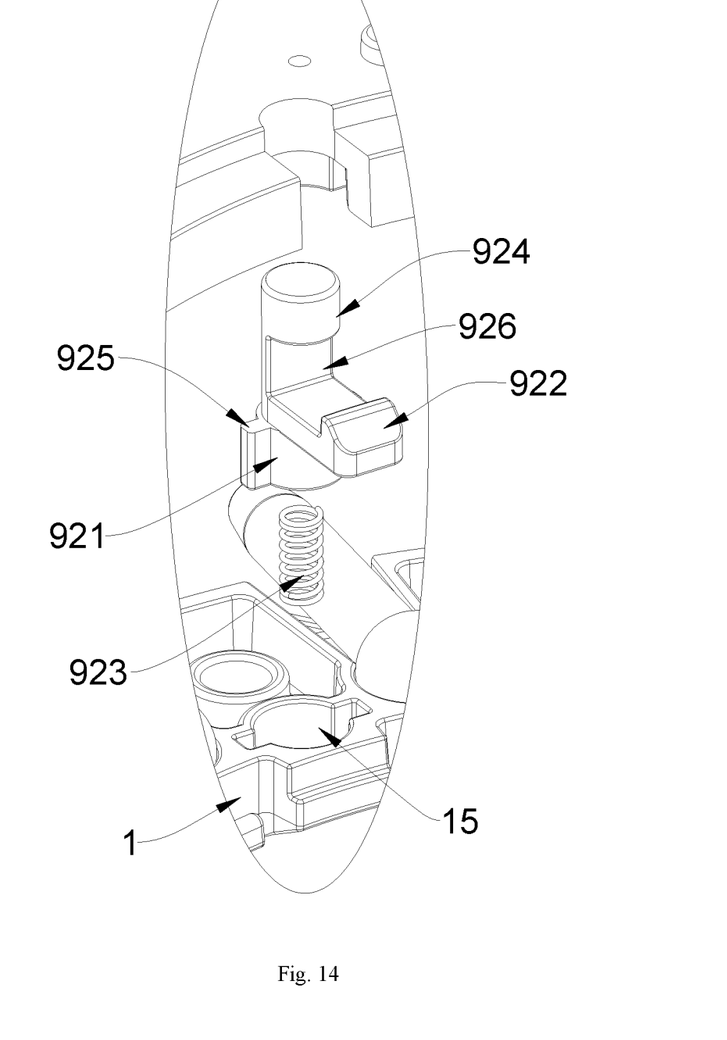
FIG. 14 is an enlarged view of a structure at D in FIG. 13.
Figure 15:
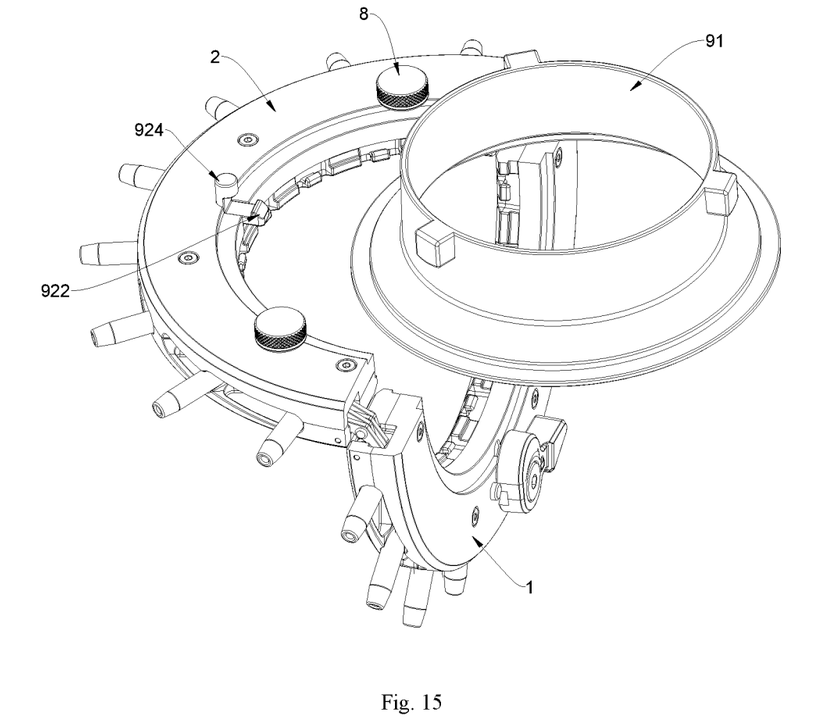
FIG. 15 is a schematic structural diagram of separation of an elastic buckle unit and a connecting seat in the utility model.
Figure 16:
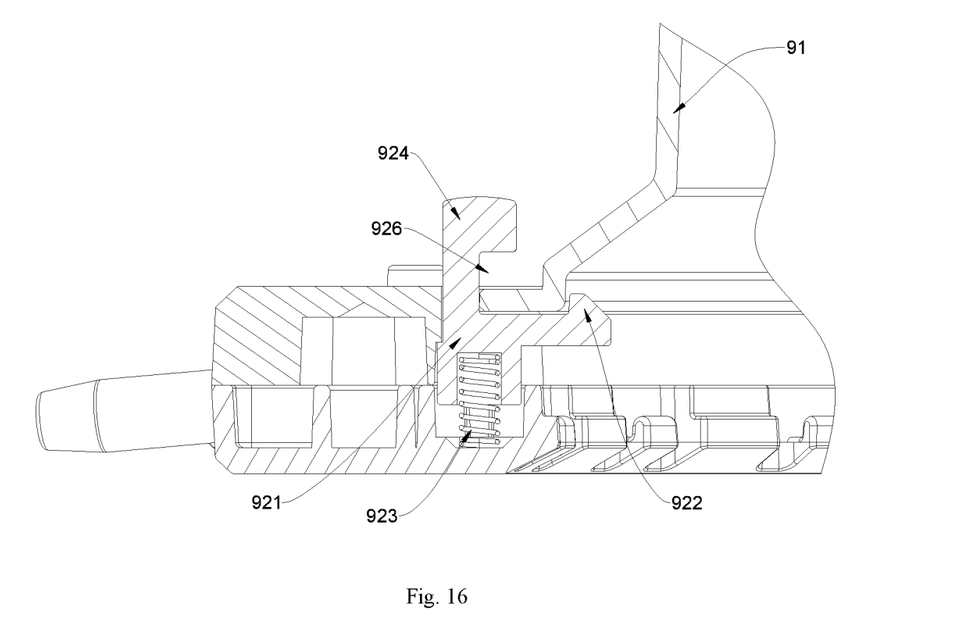
FIG. 16 is a cross-sectional view of a matching structure of an elastic buckle unit and a connecting seat in the utility model.
Figure 17:
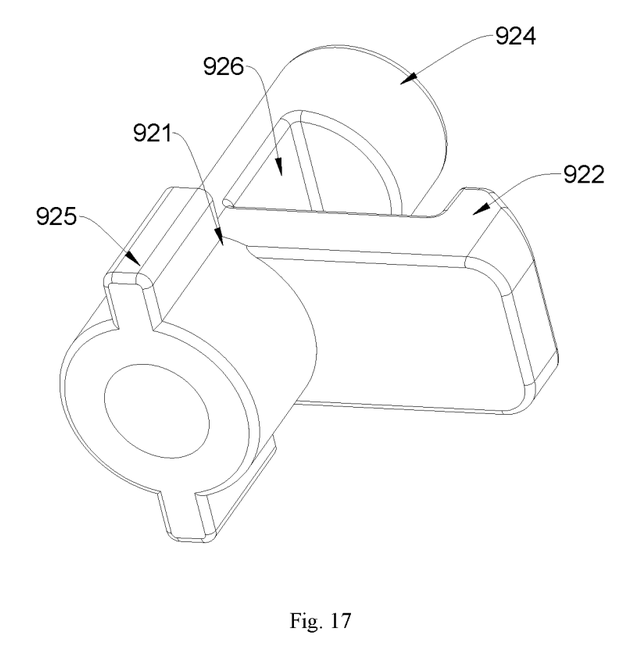
FIG. 17 is a schematic structural diagram of a part of an elastic buckle unit in the utility model, wherein an elastic piece is removed.

A connecting line of the axis of the connecting shaft 5, the axis of the first guide shaft 31 and the axis of the first adapter shaft 32 is triangular. As shown in FIG. 12, when the first tray body 1 and the second tray body 2 are in an up-down overlaid state, parts of the first cross arms 3 and the second cross arms 4 and the connecting shaft 5 are located outside; and the rest parts are hidden in the first tray body 1 and the second tray body 2.

Figure 1:
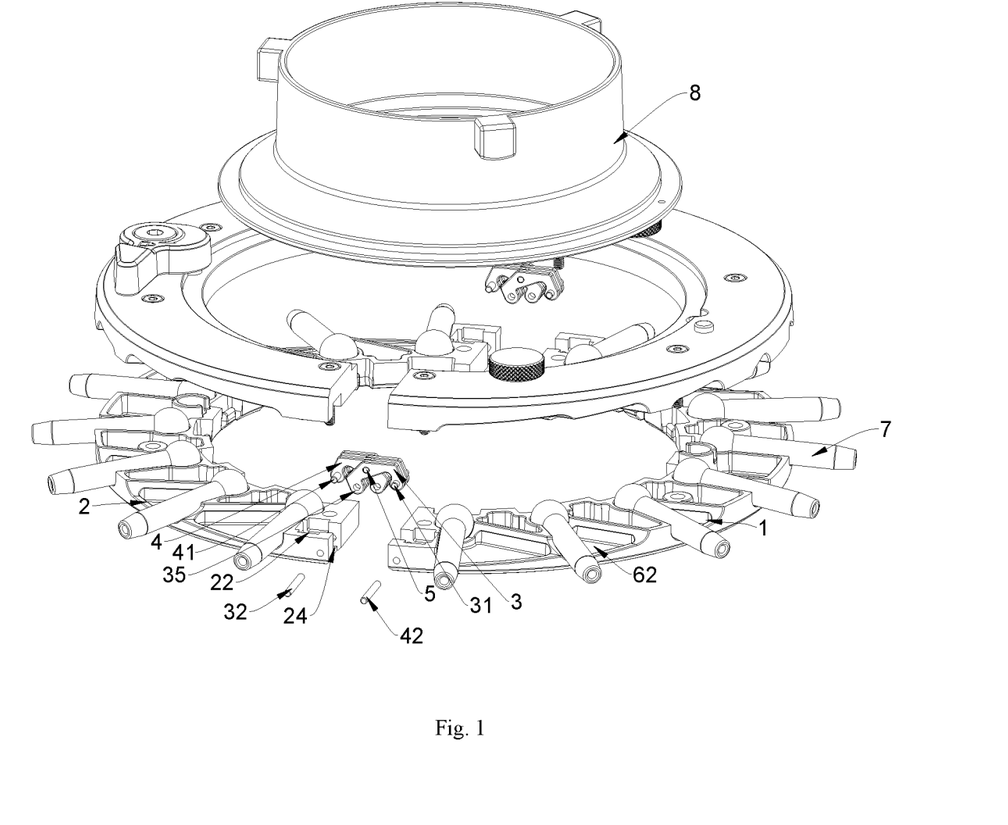
FIG. 1 is a schematic diagram of a split structure of a soft box umbrella tray in the utility model.
Figure 2:
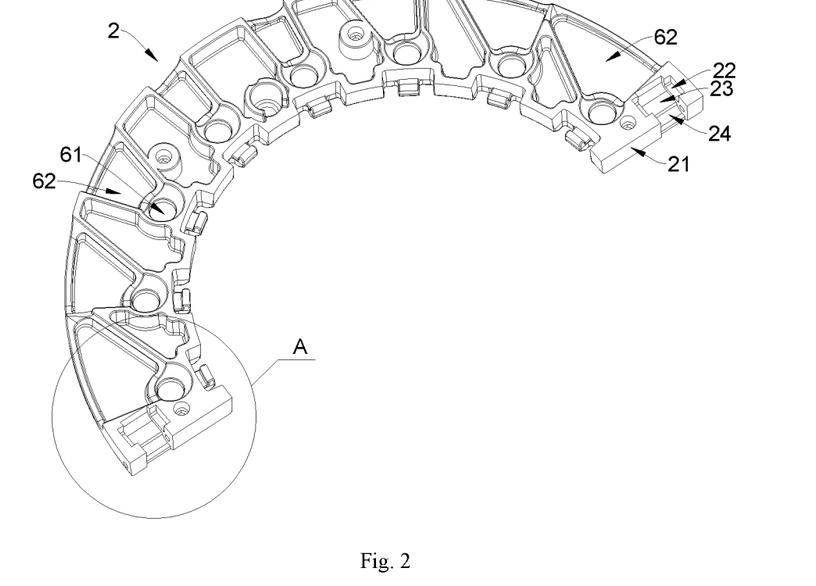
FIG. 2 is a schematic structural diagram of a lower half of a second tray body in the utility model.
Figure 3:
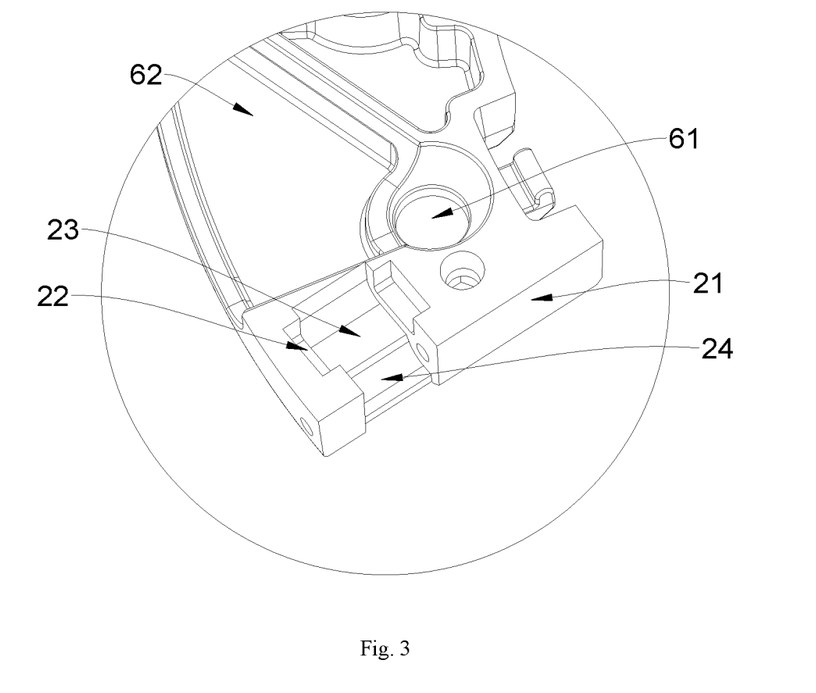
FIG. 3 is an enlarged view of a structure at A in FIG. 2.
Figure 4:
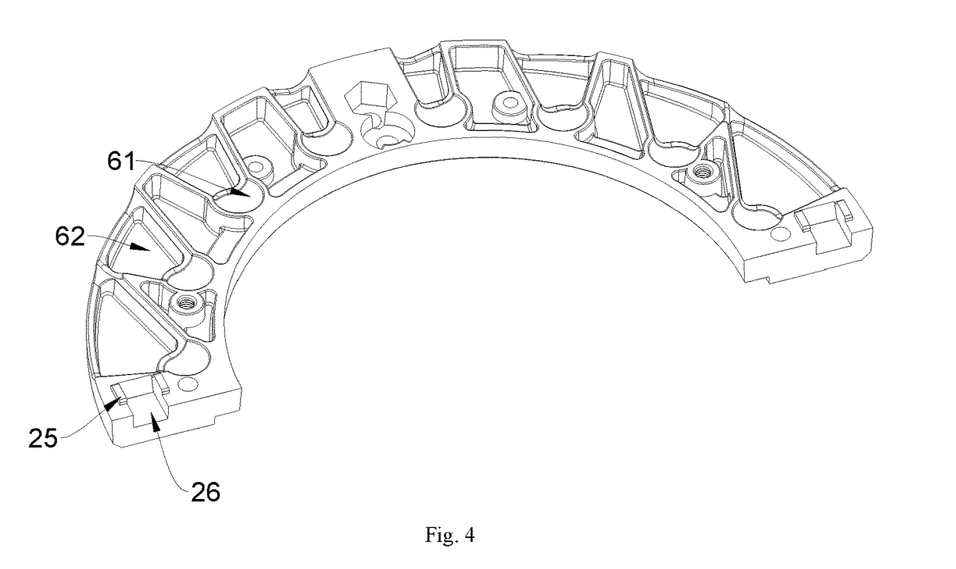
FIG. 4 is a schematic structural diagram of an upper half of a second tray body in the utility model.
Figure 5:
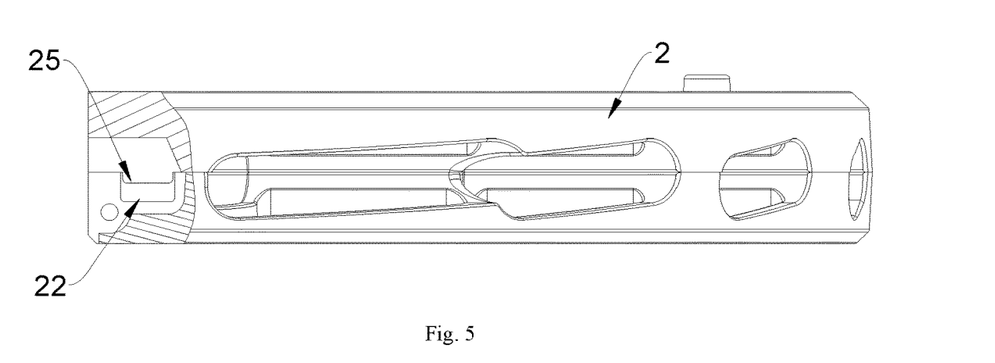
FIG. 5 is a partial sectional view of a second tray body in the utility model.

For convenience of assembly, both the first tray body 1 and the second tray body 2 are formed by splicing upper and lower parts. To ensure movement stability of the first guide shaft 31 and the second guide shaft 41, as shown in FIGS. 4 and 5, lower surfaces of upper halves of the first tray body 1 and the second tray body 2 are provided with pressing holding parts 25, which can extend into the first stroke groove 12 or the second stroke groove 22. In order to expand a volume of a groove body, an expansion groove 26, which vertically faces the second groove 23 and the second groove body 24, or vertically faces the first groove 13 and the first groove body 14, is further arranged between the two pressing holding parts 25.

Figure 11:
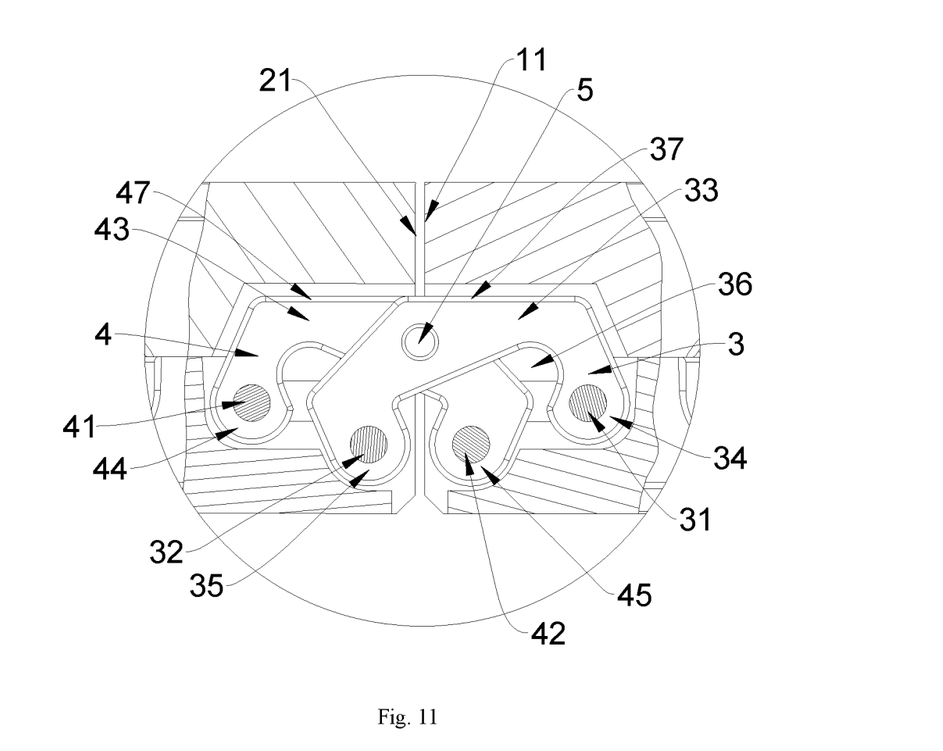
FIG. 11 is an enlarged view of a structure at C in FIG. 10.

As shown in FIG. 11, when the first tray body 1 and the second tray body 2 are in the unfolded state, the first guide shaft 31 is located at an end of the first stroke groove 12, which is the end away from the second tray body 2, with the first plane 37 facing horizontally upward; and the second guide shaft 41 is located at an end of the second stroke groove 22, which is the end away from the first tray body 1, with the second plane 47 facing horizontally upward.

As shown in FIG. 12, when the first tray body 1 and the second tray body 2 are in the up-down overlaid and folded state, the first guide shaft 31 rolls to the other end of the first stroke groove 12, with the first plane 37 facing outward; and the second guide shaft 41 rolls to the other end of the second stroke groove 22, with the second plane 47 facing outward.

The utility model further discloses a soft box, which comprises the foldable soft box umbrella tray, a plurality of supporting rods 7 arranged at intervals along the circumference of the umbrella tray, and soft light cloth, wherein the supporting rods 7 can be unfolded or folded relative to the umbrella tray, so as to open or fold the soft light cloth.

The foldable soft box umbrella tray further comprises a connecting seat 91 for connecting a light source; and the connecting seat 91 is connected with the first tray body 1 and the second tray body 2, respectively. A specific connection mode of the connecting seat 91 and the second tray body 2 may adopt any structure in the prior art, which is not limited specifically. The following is a connection mode between the connecting seat 91 and the first tray body 1. In other embodiments, the connection mode between the connecting seat 91 and the first tray body 1 may be the prior art; and the connection mode between the connecting seat 91 and the second tray body 2 may adopt the following structure.

In order to improve stability of connection between the connecting seat 91 and the first tray body 1, and facilitate disassembly and assembly of the connecting seat 91, the foldable soft box umbrella tray further comprises an elastic buckle unit 92. As shown in FIGS. 13-17, the elastic buckle unit 92 at least comprises a buckle body 921, and a limiting part 922 which extends from the buckle body 921 and can be abutted against the connecting seat 91. The buckle body 921 may be assembled on the first tray body 1; and another limiting structure may be arranged between the connecting seat 91 and the second tray body 2 at this time. In a normal use state, the limiting part 922 is abutted against the inner wall of the connecting seat 91; and the outer ring of the connecting seat 91 is abutted against the buckle body 921, so that the connecting seat 91 is firmly connected with the first tray body 1; and when external force is applied to the buckle body 921, the limiting part 922 can be driven to be separated from the connecting seat 91.

Specifically, the elastic buckle unit 92 further comprises an elastic piece 923 and a force applying part 924, wherein one end of the elastic piece 923 is abutted against the inner bottom surface of the first tray body 1; and the other end is abutted against the buckle body 921. In order to avoid deviation of the elastic piece 923, the buckle body 921 is shaped like a column which is hollow inside; and a part of the elastic piece 923 is mounted in the buckle body 921. When the external force is applied to the buckle body 921 to compress the elastic piece 923, the limiting part 922 can move down with the buckle body 921, thereby being separated from the connecting seat 91. When application of the external force on the buckle body 921 is stopped, the elastic piece 923 can drive the limiting part 922 to automatically reset, so that the limiting part 922 is abutted against and connected with the connecting seat 91.

The force applying part 924 is integrally connected with the buckle body 921 and extends out of the upper surface of the first tray body 1. In the present embodiment, the force applying part 924, the buckle body 921 and the elastic piece 923 are sequentially arranged from top to bottom in the vertical direction; and the limiting part 922 extends out vertically from the side wall of the buckle body 921 and extends radially inward, so as to be abutted against the inner wall of the connecting seat 91. Through coordination between the buckle body 921 and the limiting part 922, the connecting seat 91 is clamped radially.

In order to prevent the connecting seat 91 from being separated in the vertical direction, a cutting part 926 is formed on the side wall of the force applying part 924; and a part of the connecting seat 91 is arranged in the cutting part 926. The cutting portion 926 further provides movable space for the buckle body 921 to move up and down.

For convenience of assembly of the elastic buckle unit 92, a mounting groove 15 is arranged in the first tray body 1; and the buckle body 921 is inserted in the mounting groove 15 from top to bottom. To prevent the buckle body 921 from rotating circumferentially, a standstill locking flange 925 may further be arranged on the circumference of the buckle body 921; and the mounting groove 15 is further provided with a part adapted to the standstill locking flange 925.

The elastic buckle unit 92 limits the connecting seat 91 in the radial direction to prevent the connecting seat 91 from being horizontally separated from the first tray body 1. To prevent the connecting seat 91 from being vertically separated from the first tray body 1, fasteners 8 are further arranged, which are vertically threaded with the first tray body 1 and cooperate with the first tray body 1 to clamp the connecting seat 91 vertically. In the present embodiment, a number of the fasteners 8 is two, which are distributed on both sides of the elastic buckle unit 92.

An end of each supporting rod 7 is spherical. In other words, the end of the supporting rod is sleeved with a base provided with a spherical end. The first tray body 1 and the second tray body 2 are circumferentially provided with ball grooves 61 for clamping the ends of the supporting rods 7, and movable grooves 62 communicated with the ball grooves 61. As shown in FIG. 4, the movable groove 62 is flared. The flare here means that the structure gradually expands from the inner ring of the first tray body 1 or the second tray body 2 to the outer ring in the radial direction; and a groove wall of a flared part of the movable groove 62 increases in a gradient manner from a position radially corresponding to the ball groove 61. In other words, a height of the groove wall of the flared part of the outer ring of the movable groove 62 is not consistent and gradually increases circumferentially from the position radially corresponding to the ball groove 61.

When the supporting rod 7 is switched from the folded state to the unfolded state, the outer wall thereof moves against the groove wall of the flared part of the movable groove 62; and operations are labor-saving. Once the outer wall moves to the unfolded state, that is, to the lowest position of the groove wall, the supporting rod 7 can be maintained in the unfolded state, and is not easily switched to the folded state.

The above specific implementations are used to explain and illustrate the utility model, but not to limit it. Any modifications and changes made to the utility model within the scope of protection of the spirit and claims of the utility model fall into the scope of protection of the utility model.

The invention claimed is:

1. A foldable soft box umbrella tray, characterized by comprising:
   a first tray body (1), wherein an open end is provided with a first abutting end surface (11);
   a second tray body (2) which can be spliced with the first tray body (1) to form a ring shape, wherein an open end is provided with a second abutting end surface (21);
   first cross arms (3) which are movably connected with the first tray body (1) and the second tray body (2) respectively;
   second cross arms (4) which are movably connected with the second tray body (2) and the first tray body (1) respectively; and
   a connecting shaft (5) which passes through the first cross arms (3) and the second cross arms (4) and is rotationally connected therewith;
   wherein when the first tray body (1) and the second tray body (2) are unfolded to a same horizontal plane, the first abutting end surface (11) and the second abutting end surface (21) are attached; and the first cross arms (3) and the second cross arms (4) are hidden in the first tray body (1) and the second tray body (2).

2. The foldable soft box umbrella tray according to claim 1, characterized in that the first cross arms (3) are movably connected with the first tray body (1) through a first guide shaft (31), and are rotationally connected with the second tray body (2) through a first adapter shaft (32); and the second cross arms (4) are movably connected with the second tray body (2) through a second guide shaft (41), and are rotationally connected with the first tray body (1) through a second adapter shaft (42).

3. The foldable soft box umbrella tray according to claim 2, characterized in that a first stroke groove (12) for the first guide shaft (31) to roll is formed in the first tray body (1); and a second stroke groove (22) for the second guide shaft (41) to roll is formed in the second tray body (2).

4. The foldable soft box umbrella tray according to claim 3, characterized in that each first cross arm (3) comprises a first body (33), and a first protrusion (34) and a first extension section (35) located at both ends of the first body (33), wherein the connecting shaft (5) is arranged at the first body (33); the first guide shaft (31) is arranged at the first protrusion (34); and the first adapter shaft (32) is arranged at the first extension section (35); and
   each second cross arm (4) comprises a second body (43), and a second protrusion (44) and a second extension section (45) located at both ends of the second body (43), wherein the connecting shaft (5) is arranged at the second body (43); the second guide shaft (41) is arranged at the second protrusion (44); and the second adapter shaft (42) is arranged at the second extension section (45).

5. The foldable soft box umbrella tray according to claim 4, characterized in that a first groove (13) for accommodating the first protrusion (34) and a first groove body (14) for accommodating the second extension section (45) are formed in the first tray body (1); the first groove (13) is communicated with the first groove body (14) and is opened at the first abutting end surface (11); a second groove (23) for accommodating the second protrusion (44) and a second groove body (24) for accommodating the first extension section (35) are formed in the second tray body (2); and the second groove (23) is communicated with the second groove body (24), is opened at the second abutting end surface (21) and directly faces the first groove body (14).

6. The foldable soft box umbrella tray according to claim 5, characterized in that a first sunken groove (36) for accommodating the second adapter shaft (42) is formed at a joint of the first protrusion (34) and the first body (33).

7. The foldable soft box umbrella tray according to claim 1, characterized in that the connecting shaft (5) is arranged along a radial direction of the first tray body (1) or the second tray body (2); the first cross arm (3) has a first plane (37); the second cross arm (4) has a second plane (47); and when the first tray body (1) and the second tray body (2) are unfolded, the first plane (37) can be abutted against the first tray body (1) and the second plane (47) can be abutted against the second tray body (2).

8. The foldable soft box umbrella tray according to claim 1, characterized in that the number of the first cross arms (3) and/or the second cross arms (4) is two or more; the first cross arms (3) and the second cross arms (4) are alternately arranged; and side surfaces of the first cross arms (3) and the second cross arms (4) are attached.

9. The foldable soft box umbrella tray according to claim 1, characterized by further comprising a connecting seat (91) for connecting a light source, and an elastic buckle unit (92); the elastic buckle unit (92) at least comprises a buckle body (921) and a limiting part (922) which extends from the buckle body (921) and is abutted against the connecting seat (91); the buckle body (921) is assembled on the first tray body (1) or the second tray body (2); and when external force is applied to the buckle body (921), the limiting part (922) can be driven to be separated from the connecting seat (91).

10. The foldable soft box umbrella tray according to claim 9, characterized in that the elastic buckle unit (92) further comprises an elastic piece (923), one end of which is abutted against the buckle body (921) and is used for driving the limiting part (922) to automatically reset so as to be abutted against the connecting seat (91).

11. The foldable soft box umbrella tray according to claim 10, characterized in that the elastic buckle unit (92) further comprises a force applying part (924) which extends out of the first tray body (1) or the second tray body (2) from the buckle body (921); the force applying part (924), the buckle body (921) and the elastic piece (923) are sequentially arranged along a vertical direction; and the limiting part (922) extends inward in the radial direction.

12. The foldable soft box umbrella tray according to claim 11, characterized by further comprising fasteners (8) which are abutted against the connecting seat (91) in an axial direction.

13. A soft box, characterized by comprising the umbrella tray according to claim 1, a plurality of supporting rods (7) arranged at intervals along the circumference of the umbrella tray, and soft light cloth.

14. The soft box according to claim 13, characterized in that the first tray body (1) and the second tray body (2) are circumferentially provided with ball grooves (61) for clamping ends of the supporting rods (7), and movable grooves (62) communicated with the ball grooves (61); the movable grooves (62) are flared; and a groove wall of a flared part of each movable groove (62) increases in a gradient manner from a position radially corresponding to each ball groove (61).

* * * * *